United States Patent
Meijer et al.

(10) Patent No.: US 8,778,189 B2
(45) Date of Patent: Jul. 15, 2014

(54) USE OF AN ADSORBENT FOR THE REMOVAL OF LIQUID, GASEOUS AND/OR DISSOLVED CONSTITUENTS FROM A PROCESS STREAM

(75) Inventors: Dirk Thomas Meijer, Rozendaal (NL); Cornelis Johannes Govardus Van Strien, Elst (NL)

(73) Assignee: Veolia Water Solutions & Technologies Support, Saint Maurice (FR)

( * ) Notice: Subject to any disclaimer, the term of this patent is extended or adjusted under 35 U.S.C. 154(b) by 1111 days.

(21) Appl. No.: 12/280,918

(22) PCT Filed: Mar. 5, 2007

(86) PCT No.: PCT/EP2007/052035
§ 371 (c)(1),
(2), (4) Date: Apr. 6, 2009

(87) PCT Pub. No.: WO2007/101833
PCT Pub. Date: Sep. 13, 2007

(65) Prior Publication Data
US 2009/0178972 A1      Jul. 16, 2009

Related U.S. Application Data

(60) Provisional application No. 60/783,409, filed on Mar. 20, 2006.

(30) Foreign Application Priority Data

Mar. 6, 2006   (EP) ..................................... 06110720

(51) Int. Cl.
| | | |
|---|---|---|
| B01D 11/04 | (2006.01) | |
| B01D 15/08 | (2006.01) | |
| B01D 15/10 | (2006.01) | |
| B01J 20/02 | (2006.01) | |
| B01J 20/26 | (2006.01) | |
| C02F 1/26 | (2006.01) | |
| C02F 1/28 | (2006.01) | |
| B01D 15/00 | (2006.01) | |
| B01J 20/18 | (2006.01) | |
| B01J 20/20 | (2006.01) | |
| B01J 20/28 | (2006.01) | |
| C02F 9/00 | (2006.01) | |

(52) U.S. Cl.
CPC ................ B01D 11/04 (2013.01); B01D 15/00 (2013.01); B01J 20/18 (2013.01); B01J 20/20 (2013.01); B01J 20/26 (2013.01); B01J 20/267 (2013.01); B01J 20/28052 (2013.01); B01J 20/28078 (2013.01); B01J 20/28097 (2013.01); C02F 1/26 (2013.01); C02F 1/28 (2013.01); C02F 9/00 (2013.01); C02F 1/288 (2013.01); C02F 1/281 (2013.01); C02F 1/283 (2013.01); C02F 1/285 (2013.01)
USPC ........... 210/656; 210/636; 210/679; 210/296; 210/198.2; 210/201; 210/202; 210/690; 210/691; 210/692; 210/502.1; 210/509; 210/634

(58) Field of Classification Search
USPC .......................................... 210/263, 290, 638
See application file for complete search history.

(56) References Cited

U.S. PATENT DOCUMENTS

| | | | |
|---|---|---|---|
| 4,842,745 A | 6/1989 | Weiler et al. | |
| 5,221,480 A | 6/1993 | Schultheis et al. | |
| 5,679,248 A * | 10/1997 | Blaney | 210/315 |
| 2005/0252863 A1 * | 11/2005 | Wurth et al. | 210/681 |

FOREIGN PATENT DOCUMENTS

| | | |
|---|---|---|
| DE | 4103165 A1 | 8/1992 |
| DE | 10130108 A1 | 2/2003 |
| EP | 0767143AZ | 4/1997 |
| GB | 1535481 A | 12/1978 |
| JP | 10151373 A | 6/1998 |
| WO | 9403249 A | 2/1994 |
| WO | WO9403249 * | 2/1994 |
| WO | 03/053862 | 7/2003 |

OTHER PUBLICATIONS

Ku et al. "Removal of phenols from aqueous solution by XAD-4 resin". 2000. Journal of Hazardous Materials B80. pp. 59-68.*
Burnham et al. "Identification and Estimation of Neutral Organic Contaminants in Potable Water". 1972. Analytical Chemistry. vol. 44, pp. 139-142.*
Lee et al. "Adsorption of dichloromethane from water onto a hydrophobic plymer resin XAD-1600". 2005. Water Research. vol. 39. pp. 617-629.*

* cited by examiner

Primary Examiner — Krishnan S Menon
(74) Attorney, Agent, or Firm — Coats and Bennett PLLC

(57) ABSTRACT

A method for removing liquid, gaseous and/or dissolved constituents from an aqueous stream includes contacting the aqueous stream with a porous material and then contacting the aqueous stream with an adsorbent material. The porous material includes pores having an average diameter of approximately 0.01 μm to approximately 50 μm and an extraction liquid immobilized within at least a portion of the pores.

17 Claims, No Drawings

USE OF AN ADSORBENT FOR THE REMOVAL OF LIQUID, GASEOUS AND/OR DISSOLVED CONSTITUENTS FROM A PROCESS STREAM

This application is a U.S. National Stage Application of PCT Application No. PCT/EP207/052035, with an international filing date of 5 Mar. 2007. Applicant claims priority based on European Patent Application No. 06110720.7 filed 6 Mar. 2006. In addition, this application claims priority to provisional application No. 60/783,409 filed on Mar. 20, 2006, the subject matter of which is incorporated herein.

The invention pertains to a process for the removal of liquid, gaseous and/or dissolved constituents from a process stream.

Such a process is known from WO 94/03249, which discloses the use of porous polymers, the pores of which are filled with an extraction liquid immobilized therein, for removing hydrophobic constituents from an aqueous solution. The porous polymer contains pores having an average diameter of 0.1 μm or more. The porous materials described herein are very effective in the removal of organic constituents, such as benzene, toluene, ethyl benzene, xylene, and polycyclic aromatic hydrocarbons such as naphthalene and anthracene, which are poorly soluble or insoluble in the aqueous solution. These materials, however, are much less effective in the removal of more soluble organic constituents, such as phenol, dichloromethane, and methyl tert-butyl ether. The amount of porous material necessary to considerably reduce the concentration of these constituents in the aqueous process stream—for example a reduction by a factor of 1,000 in concentration in the effluent—is too high, and the dimensions of the cleaning unit containing the porous material will become too large.

The object of the present invention is to provide an improved process for the removal of constituents from a process stream which enables the removal of more soluble constituents more effectively.

This object is achieved by a process comprising the steps of
a) contacting a process stream with a porous material having pores with a diameter of 0.01 to 50 μm wherein an extraction liquid is immobilized; and
b) subsequently contacting the resulting process stream with an adsorbent.

The process of the invention enables effective removal of poorly soluble or insoluble constituents, such as benzene, toluene, and xylene, as well as of more soluble constituents such as dichloromethane and methyl tert-butyl ether. A further advantage is that the dimensions of the cleaning unit comprising the porous material and the adsorbent can be reduced considerably, which is more attractive economically. The porous material will extract poorly soluble or insoluble constituents which would otherwise irreversibly adsorb onto the adsorbent, thereby ensuring that the lifespan of the adsorbent in the process is increased, or alternatively, that a smaller amount of adsorbent can be used. A longer lifespan or a smaller amount of adsorbent renders the process more attractive economically. A further advantage of the process of the invention is that the extracted constituents can be removed from the extraction liquid in the porous material by regeneration with steam.

In a preferred embodiment of the present invention, the size of the bed of porous material is chosen such that the poorly soluble or insoluble constituents are reduced by more than a factor 100, preferably by more than a factor 1,000, and most preferably by more than a factor 10,000. In this way, the adsorbent, which is also able to adsorb the poorly soluble or insoluble constituents, can be used almost exclusively for the removal of constituents not effectively removed by the porous material. This further enables the adsorbent to be used for an even longer period of time, rendering the process more attractive economically. It is noted that the determination of the size of the bed of porous material lies within the skill of the skilled person.

Alternatively, this effect can be achieved using a bed of the porous material of the invention having a size so as to reduce the concentration of the poorly soluble or insoluble organic constituents in the process stream to less than 5% of the solubility of the constituent having the highest solubility, preferably to less than 1%, more preferably to less than 0.5%, and most preferably to less than 0.05%. For the purposes of determining the solubility of the constituent having the highest solubility of the poorly soluble and insoluble organic constituents in the process stream, the constituent is preferably chosen from benzene, toluene, ethyl benzene, xylene, and polycyclic aromatic hydrocarbons such as naphthalene and anthracene.

The porous material of the invention can be a porous polymer. Examples of suitable polymers are low-pressure polyethene, high-pressure polyethene, polypropylene, polystyrene, acrylonitrile-butadiene-styrene terpolymers, styrene-acrylonitrile copolymers, styrene-butadiene copolymers, poly(4-methyl-pentene-1), and polybutene.

Optimum results have been attained using polyolefin-based polymers. In that case preference is given to the use of a porous material based on polypropylene.

The porous material can be used in the form of a fibre, film, granulate or powder, with preference being given to use in the form of a granulate or powder having an average particle diameter of 0.1 to 10 mm.

The porous material of the invention is at least partially filled with an extraction liquid, which is immobilized in the pores of the porous material. This "immobilization" can be achieved by using a porous material having an average pore diameter of between 0.01 and 50 μm, preferably an average pore diameter of between 0.1 and 30 μm, and most preferably an average pore diameter of 0.2-15 μm. Additionally, the extraction liquid generally is a liquid with minimal solubility in the medium to be extracted in order to minimize the loss of extraction liquid during the process of the invention, and it also helps to keep the liquid immobilized in the pores of the porous material. As a rule, the solubility of these liquids in the medium to be extracted is not more than 100 mg per 1,000 ml.

The extraction liquid suitable for the process of the invention is a liquid which has the highest possible affinity for the organic constituents to be extracted. Suitable examples of such extraction liquids are liquids in the form of a glycerol ester of one or more, preferably unsaturated fatty acids, and oils, such as palm oil, olive oil, peanut oil, paraffin oil, fish oil such as herring oil, linseed oil, soybean oil, and castor oil. A combination of two or more of these extraction liquids is also contemplated.

Preferably, at least 30 vol. % of the pores of the porous material is filled with extraction liquid. In a more preferred embodiment of the process of the invention, at least 50 vol. % of the pores of the porous material is filled with extraction liquid. It is most preferred to use a porous material at least 90 vol. % of the pores of which is filled with extraction liquid.

The adsorbent according to the invention may be any material, and in particular any porous material, suitable for adsorbing the constituents to be removed from the process stream, and in particular suitable for adsorbing the more soluble constituents. Suitable examples of adsorbents are activated carbon, carbon black, synthetic particles based on a wide range of polymers, porous inorganic materials modified with organic substituents or not, such as: porous silica or titania, zeolites such as molecular sieves, silica gels, and porous alumina including the activated types. So far, optimum results have been achieved using an adsorbent selected from the group of activated carbon, zeolites, carbonized sulphonated cross-linked polystyrene, and cross-linked polystyrene such as polystyrene cross-linked with divinyl benzene. Activated carbon is less preferred, as the constituents adsorbed thereon in the process of the invention are irreversibly adsorbed onto the adsorbent and cannot be sufficiently regenerated with, for instance, steam.

The porous material and the adsorbent are generally provided in separate beds inside a cleaning unit. The volume ratio of the porous material to the adsorbent depends on the types of constituents (poorly soluble/insoluble versus more soluble constituents) and the concentration of these constituents in the process stream. Generally, the volume ratio of porous material filled with extraction liquid to adsorbent is between 20:1 and 1:20, preferably between 10:1 and 1:10, and most preferably between 5:1 and 1:5.

In a preferred embodiment of the process of the invention, the porous material which is saturated with constituents extracted from the process stream is regenerated, preferably by being contacted with steam or hot air, or a solution of acid or base, depending on the nature of the extracted constituents. If the extracted constituents are predominantly organic, the porous material is preferably regenerated using steam or hot air.

Preferably, regeneration is performed such that the constituents that emerge from the porous material do not come into contact with the adsorbent, as they will irreversibly adsorb to the adsorbent, thereby reducing the lifespan of the adsorbent.

The invention further pertains to a cleaning unit for the removal of liquid, gaseous and/or dissolved constituents from a process stream comprising:
a) an inlet for introducing the process stream into the cleaning unit;
b) a first bed of porous material having pores with an average diameter of 0.01-50 mm wherein an extraction liquid is immobilized;
c) a second bed of an adsorbent;
d) an outlet for removing the process stream from the cleaning unit,
wherein the first bed is located in between the inlet and the second bed and the second bed is located in between the first bed and the outlet.

This cleaning unit is suitable for performing the process of the invention. The process stream containing the constituents to be removed is led into the cleaning unit via the inlet. The process stream is then contacted with the first bed of porous material filled with extraction liquid, where the concentration of poorly soluble or insoluble constituents is reduced by a factor of at least 100, preferably of at least 1,000, and most preferably of at least 10,000. Also more soluble constituents will be removed, but to a much lesser extent. The thus treated process stream is subsequently contacted with the second bed of adsorbent, where the concentration of the more soluble constituents is reduced by a factor of at least 100, preferably of at least 1,000, and most preferably of at least 10,000. The cleaned process stream is subsequently led out of the cleaning unit via the outlet.

In one embodiment the first and second beds are positioned adjacent to each other in one column. This embodiment enables a reduction of the dimensions of the cleaning unit, rendering the cleaning unit simpler and more attractive economically.

In one embodiment of the cleaning unit, the first and second beds are located in two separate sub-units. These sub-units are interconnected via the outlet of the first sub-unit containing the first bed and the inlet of the second sub-unit containing the second bed, so that the process of the invention can be conducted therein.

It is also envisaged to use a third sub-unit containing a bed of porous material filled with extraction liquid, which is connected in parallel to the first sub-unit. With this configuration it is possible to lead the (untreated) process stream through the third sub-unit once the concentration of the constituents to be extracted increases to an unacceptable level beyond the first sub-unit. In the meantime, the porous material of the first bed, which is saturated with the extracted constituents, can be regenerated, e.g. by exposing it to steam or hot air.

The invention is illustrated by the following Examples.

EXAMPLES

Two glass columns both having a diameter of 5 cm were placed in series one after the other. In the first column a bed of MPP-10 (a porous polypropylene filled with castor oil as extraction liquid ex Akzo Nobel) was placed; the height of the bed being 5 cm. The second column was filled with a 10 cm high bed of adsorbent XAD-4 (a porous polystyrene-vinylbenzene resin ex Rohm & Haas). The first and second columns were connected such that a water stream could be passed through the respective columns.

The water stream contained 575 ppm phenol and 285 ppm toluene. The flow rate of the water stream was 3.7 l/h.

The outlet concentrations of phenol and toluene were measured after the first column (comprising MPP-10) and after the second column (comprising XAD-4). The results are shown as a function of time in the Table below.

TABLE 1

| | Outlet concentration after 1st column | | Outlet concentration after 2nd column | |
|---|---|---|---|---|
| Time (min) | Phenol (ppm) | Toluene (ppm) | Phenol (ppm) | Toluene (ppm) |
| 1 | 5 | 0 | 0 | 0 |
| 10 | 3 | 0 | 0 | 0 |
| 20 | 365 | 0 | 4 | 0 |
| 40 | 445 | 0 | 21 | 0 |
| 60 | 480 | 0 | 68 | 0 |
| 80 | 515 | 0 | 180 | 0 |
| 100 | 519 | 0 | 304 | 0 |
| 120 | 536 | 0 | 435 | 0 |

The Table demonstrates that toluene is extracted completely by the porous material in the first column, and that phenol breaks through the first bed of MPP-10 already within 20 minutes. The phenol concentration after the second column is considerably lower than the phenol concentration after the first column. This experiment illustrates that toluene can be removed completely by the porous material of the invention, while the second bed significantly extends the breakthrough time of phenol without being contaminated by toluene.

The invention claimed is:
1. A method for removing liquid, gaseous and/or dissolved constituents from an aqueous stream, the method comprising:
providing a single column structure comprising a first bed of porous material, the porous material including pores having an average diameter of 0.01 µm to 50 µm and an extraction liquid immobilized within at least a portion of the pores; and a second bed of adsorbent material, the adsorbent material being chosen from the group consisting of zeolites, carbonized sulphonated cross-linked polystyrene, and cross linked poly-styrene;

wherein the first and second beds are separate and adjacent in the column;

first directing the aqueous stream into the single column and into the first bed and extracting a first set of constituents from the aqueous stream;

thereafter directing the aqueous stream into the second bed and adsorbing a second set of constituents chosen from the group consisting of phenol, dichloromethane, and methyl tertiary-butyl ether by contacting the aqueous stream with adsorbent material; and regenerating the porous material saturated with constituents extracted from the aqueous stream, wherein the regeneration is performed such that the constituents that emerge from the first bed of porous material do not come into contact with the second bed of adsorbent.

2. The method of claim 1 wherein the extraction liquid is immobilized within at least 30 vol. % of the pores in the porous material.

3. The method of claim 2 wherein the extraction liquid is immobilized within at least 90 vol. % of the pores in the porous material.

4. The method of claim 2 wherein the porous material is a polyolefin-based polymer.

5. The method of claim 1 further comprising:

extracting in the first set of constituents a plurality of soluble or insoluble constituents from the aqueous stream by contacting the aqueous stream with the first bed of porous material; and reducing the concentration of the plurality of soluble or insoluble constituents by a factor of at least 100.

6. The method of claim 5 further comprising reducing the concentration of the plurality of soluble or insoluble constituents by a factor of at least 10,000.

7. The method of claim 1 wherein the first and second set of constituents include at least a first soluble or insoluble constituent and a second soluble or insoluble constituent; the method further comprising reducing the concentration of the at least first soluble or insoluble constituent to less than 5% of the concentration of the second soluble or insoluble constituent.

8. The method of claim 7 further comprising reducing the concentration of the at least first soluble or insoluble constituent to less than 0.05% of the concentration of the second soluble or insoluble constituent.

9. The method of claim 7 wherein the first constituent is selected from the group of benzene, toluene, ethyl benzene, xylene, and polycyclic aromatic hydrocarbons.

10. The method of claim 1 wherein the first porous material is a fiber, film, granulate or powder having an average particle diameter of between approximately 0.1 mm to approximately 10 mm.

11. The method of claim 1 wherein the pores in the first porous material have an average diameter of between approximately 0.2 µm to approximately 15 µm.

12. The method of claim 1 wherein the volume ratio of the first porous material with extraction liquid immobilized therein to the adsorbent is between approximately 20:1 and approximately 1:20.

13. The method of claim 12 wherein the volume ratio of the first porous material with extraction liquid immobilized therein to the adsorbent is between approximately 5:1 and approximately 1:5.

14. The method of claim 1, wherein regenerating the first bed of porous material occurs by contacting the first bed of porous material with steam, hot air, or a solution of acid or base.

15. A process for the removal of liquid gaseous and/or dissolved constituents from a process stream comprising:

extracting a first set of constituents in a process stream chosen from the group consisting of benzene, toluene, ethyl benzene, xylene and polycyclic aromatic hydrocarbons, wherein extracting comprises contacting the process stream with a first bed of porous material having pores with an average diameter of 0.01 µm to 50 µm and having an extraction liquid immobilized within the pores, wherein the extracting step causes the first set of constituents in the process stream to be extracted into the extraction liquid;

thereafter, adsorbing a second set of constituents in the process stream chosen from the group consisting of phenol, dichloromethane, and methyl tertiary-butyl ether, wherein adsorbing comprises contacting the process steam with a second bed of an adsorbent, said adsorbent being chosen from the group consisting of zeolites, carbonized sulphonated cross-linked polystyrene, and cross-linked polystyrene;

regenerating the porous material having the first set of constituents in the extraction liquid by removing the first set of constituents from the first bed such that the first set of constituents does not come into contact with the second bed; and wherein the first and second beds are maintained separate and adjacent to one another in a single column.

16. The process of claim 15 wherein the extraction liquid is immobilized within at least 30 vol. % of the pores in the porous material.

17. The method of claim 15, wherein the regeneration method comprises steam.

* * * * *